United States Patent [19]
Pacholok

[11] Patent Number: 5,503,059
[45] Date of Patent: Apr. 2, 1996

[54] VEHICLE DISABLING DEVICE AND METHOD

[76] Inventor: David R. Pacholok, 1815 W. Higgins Rd., Sleepy Hollow, Ill. 60118

[21] Appl. No.: 367,581

[22] Filed: Jan. 3, 1995

[51] Int. Cl.⁶ .......................... F41B 15/00; B60K 28/10; B60L 3/00
[52] U.S. Cl. .................. 89/1.11; 180/167; 180/279; 244/3.12
[58] Field of Search .................... 89/1.1, 1.11; 244/3.12; 180/167, 169, 279

[56] References Cited

U.S. PATENT DOCUMENTS

| | | |
|---|---|---|
| 1,418,601 | 6/1922 | Minnick . |
| 1,803,291 | 4/1931 | Adler, Jr. . |
| 2,019,976 | 11/1935 | Huebscher . |
| 2,640,979 | 6/1953 | Carter . |
| 2,911,635 | 11/1959 | Ross . |
| 3,368,639 | 2/1968 | Deane . |
| 4,619,231 | 10/1986 | Stolar et al. . |
| 4,893,815 | 1/1990 | Rowan . |
| 4,967,862 | 11/1990 | Pong et al. ............................. 180/279 |
| 5,184,694 | 2/1993 | Magrath, Jr. et al. . |
| 5,194,687 | 3/1993 | Garfinkle ................................. 89/1.11 |
| 5,293,527 | 3/1994 | Sutton et al. . |
| 5,337,013 | 8/1994 | Langer et al. . |
| 5,350,992 | 9/1994 | Colter . |
| 5,377,164 | 12/1994 | Almstrom et al. ..................... 244/3.12 |
| 5,415,246 | 5/1995 | Cooper .................................... 89/1.11 |
| 5,419,512 | 5/1995 | Holzschuh et al. .................... 244/3.12 |

Primary Examiner—Charles T. Jordan
Assistant Examiner—Theresa M. Wesson
Attorney, Agent, or Firm—Mathew R. P. Perrone, Jr.

[57] ABSTRACT

A vehicle disabling device is positioned under a vehicle desired to be stopped, sends a capacitive discharge therethrough, and disables at least one electric system of the vehicle.

53 Claims, 10 Drawing Sheets

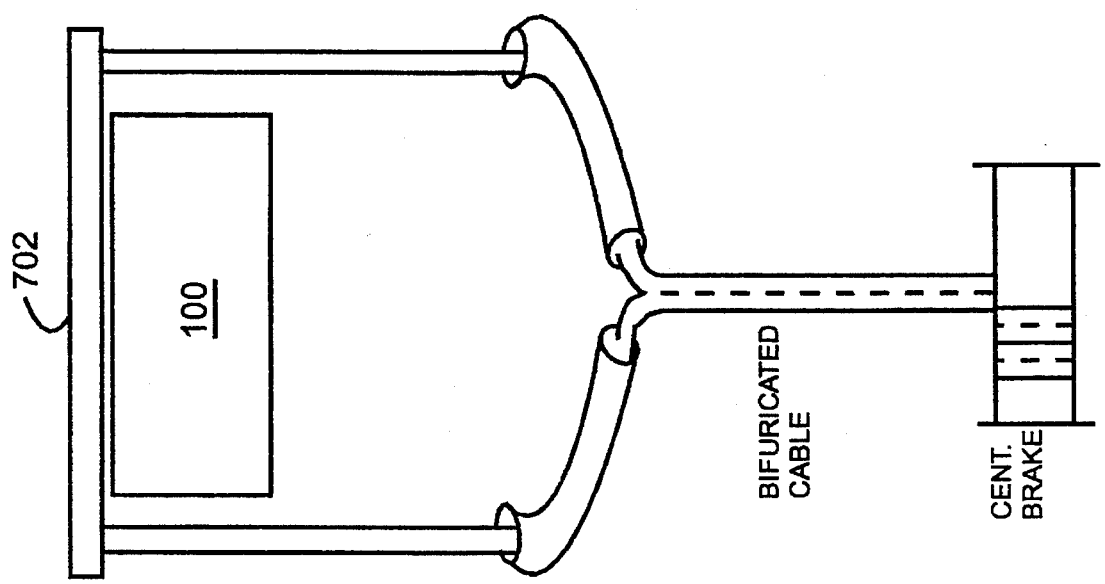

VEHICLE DISABLING DEVICE AND METHOD

This invention relates to a vehicle disabling device and more particularly to a device and method for disabling the electronic functions of a vehicle and causing that vehicle to slow down or stop.

BACKGROUND OF THE INVENTION

In this litigious society, even a police chase after a criminal can prove dangerous to the municipality, which sponsors the police department. Such a high speed police chase sometimes causes injury to the pursuing police officer or innocent victims, in addition to the offending motorist or other criminal.

Not only does an innocent party suffer improperly, he or she is also hurt substantially for merely being at the wrong place at the wrong time. This problem has become so severe that a number of states are even restricting high speed police chases by statute.

From both a military and civilian standpoint, it can be desirable to disable a vehicle, in a simple fashion without creating a danger to the surrounding area. Various known electronic devices are most ineffective. These devices can flatten tires or disable engines.

Known devices exist which can flatten or incapacitate a vehicle tire. If this occurs at a high speed, the driver may lose control of the vehicle. An uncontrolled vehicle is extremely dangerous. Whether the tire flattening device is electronically or mechanically actuated, it is highly desirable to disable the vehicle and incapacitate the escape mechanism without this danger of losing control of the vehicle.

In addition to the tire flattening device, an electronic device can disable a vehicle engine by attacking various vehicle systems. One such system is an electronic engine control computer. The second is the electronic sensors, which feed information to the electronic engine control computer. The third system is a set of sensors in the vehicle's signal processing modules. Damage to or destruction of the electronic engine control computer or electronic engine module will stop the vehicle by disabling the fuel delivery or ignition pulses. Damage to various sensors will usually cause activation of a redundant (also known as the limp home) mode where vehicle performance is drastically reduced.

A device in this class is generically known as an anti-vehicle electronic counter measure (AVECM). The high burst of pulsed microwave energy from one type of an electronic engine disabling device, while it may disable the criminal vehicle, can also disable adjacent computers and unintended vehicles. The microwave energy lacks control so severely, that the advantages of using the high microwave energy or similar disabling devices are far outweighed by the disadvantages.

Especially problematical is the production of the high burst of pulsed microwave energy by an electromagnetic pulse generating system. The transmission of this cannot be specifically directed to only desired target. This lack of direction can very adversely affect unintended vehicles as well as computers in nearby buildings.

Typically, a vehicle disabling device is desired to be of a type referred to as a man-portable barrier. In other words, the device may be carried by a man. Present man-portable barrier systems have significant technical shortcomings, because they must dissipate fully the kinetic energy of the target vehicle. This places severe technical constraints on any man-deployable system, requiring that they be lightweight, safe, rapidly deployable, and easy to operate by a small unit or patrol.

It is difficult for light-weight systems to sustain the kinetic energy dissipation rate required to stop a typical vehicle traveling at moderate to high speeds. A vehicle weighing 6,800 kilograms (15,000 pounds) and traveling at 80 kilometers per hour (50 miles per hour) has a kinetic energy of over 170,000 newton-meters (1.25 million foot-pounds), for example. The development of a system light enough to be man-deployable and able to sustain the mechanical forces required to dissipate that force is extremely difficult to realize.

In an attempt to avoid the direct dissipation of these immense kinetic forces, the traditional approach is to disable the target vehicle or operator by various means. These typically involve severe damage to the vehicle, driver, occupants, and even bystanding personnel. These means are, therefore, of questionable use in a civilian law enforcement environment.

Tire deflation and related techniques can be easily circumvented by current commercially available deflation-resistant, runflat, tire technology and means such as expanded cell polymer foam tire fillers. Even when tires are successfully deflated, forward progress can be maintained for a long distances, because the vehicle drive train is still operational.

Arresting the vehicle by mechanical disruption is extremely hazardous. Typical mechanical disruption is by small arms or ballistic projectiles. This method is intrinsically hazardous, especially in urban or populated areas and is not very reliable, as the projectiles must impact either a critical vehicle component or the driver, either of which presents considerable target acquisition problems because of target speed and maneuverability.

It is desired to avoid these dangers and such methods. In response, police and military security agents often pursue the target vehicles at high speeds which result in extreme hazards to these personnel and also to innocent bystanders, besides being frequently ineffective in arresting the target vehicle and its occupants.

Local, state, and federal police agencies are especially concerned with reducing or eliminating high speed pursuits or target vehicles because of the potentially disastrous effects on public and/or private property and the personal welfare of non-involved third parties. In addition to the almost unacceptable chance of hurting an innocent party, the financial costs thereof can be immense.

Civilian, private, and public security agencies and commercial organizations are equally concerned with prevention of unauthorized suspect or terrorist vehicle penetration. Therefore, development of AVECM technology and devices has great commercial as well as military applications, both domestically and internationally.

Other vehicle penetration systems also have shortcomings. Mechanical disruption of the vehicle by stationary and associated attached penetration is also hazardous and often ineffective. These systems attempt to use the vehicle's own kinetic energy to produce mechanical damage. These systems typically employ spikes, pikes, turnstiles, hooks, cables, or related kinetic pendulum-type devices.

The effectiveness of these devices is overly dependent on the vehicle's weight, physical design and configuration, speed vector of approach; which have, in fact, exhibited variable results in actual field use. These systems are also not readily deployable by a single man in the majority of cases.

Some non-traditional methods are developed in an attempt to overcome these problems. These include chemical agents, adhesives, and foams. These are also of questionable and unproven effectiveness and are potentially hazardous, non-selective. Additionally, these methods may pose a toxic or environmental hazard.

The methods of deployment of these chemical-based compounds require complex equipment. Typical parts of this equipment include, but are not limited to; nozzles, hoses, and pressure vessels. This complex equipment can malfunction or suffer damage from the chemicals themselves.

The effectiveness of these chemicals themselves may be compromised by environmental conditions, such as precipitation, temperature, humidity, wind, road surface characteristics and other factors. The use of caustic and toxic materials may also violate United States and international laws and regulations covering the use of chemicals in warfare.

SUMMARY OF THE INVENTION

Therefore, among the many objectives of this invention is to provide a remotely activatable vehicle disabling device and method capable of disabling a vehicle.

A further objective of this invention is to provide a vehicle disabling device fixed in the road.

A still further objective of this invention is to provide a mobile vehicle disabling device.

Yet a further objective of this invention is to provide a vehicle disabling device, which dissipates the kinetic energy of a vehicle.

Also an objective of this invention is to provide a vehicle disabling device, with a limited activation range in order to limit the effect to the one vehicle desired to be stopped.

Another objective of this invention is to provide a vehicle disabling device to minimize damage from a high speed chase.

Yet another objective of this invention is to provide a vehicle disabling device to minimize injury from a high speed chase.

Still another objective of this invention is to provide a vehicle disabling device, which avoids the use of chemicals.

A further objective of this invention is to provide a method for disabling the electronic engine controls of a vehicle.

A still further objective of this invention is to provide a method for reducing the vehicle to a redundant operating mode.

Yet a further objective of this invention is to provide a method to safely dissipate the kinetic energy of a vehicle.

Also an objective of this invention is to provide a method for disabling a vehicle having a reduced undesirable impact on the environment.

Another objective of this invention is to provide a method for disabling a vehicle active in a restricted area.

Yet another objective of this invention is to provide a method for disabling a vehicle to minimize injury from a high speed chase.

Still another objective of this invention is to provide a vehicle disabling device, which avoids the use of chemicals.

These and other objectives of the invention (which other objectives become clear by consideration of the specification, claims and drawings as a whole) are met by providing a vehicle disabling device, which can contact a vehicle, send a capacitive discharge therethrough, and disable at least one electric system of a vehicle.

BRIEF DESCRIPTION OF DRAWINGS

FIG. 12 depicts a splitable wire guidance system 700 for vehicle mounted anti-vehicle electronic counter measure device 100.

Throughout the figures of the drawings, where the same part appears in more than one figure of the drawings, the same number is applied thereto.

DESCRIPTION OF THE PREFERRED EMBODIMENTS

Figure 1:
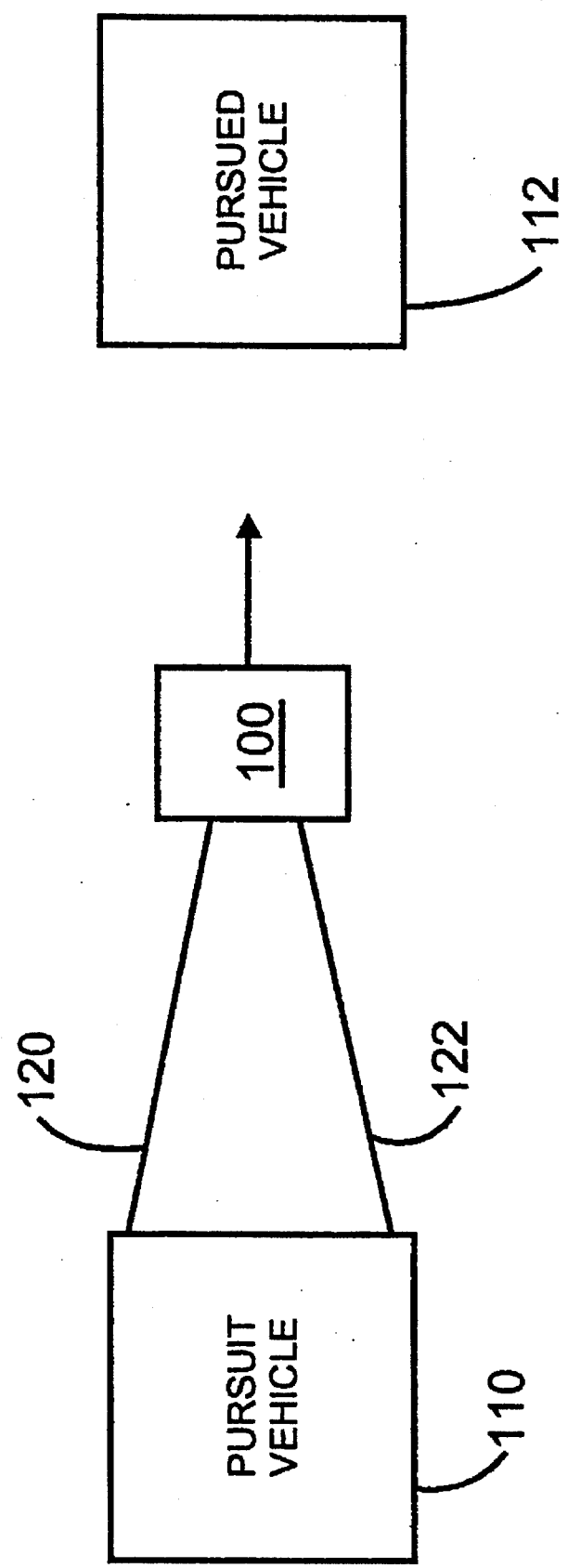
FIG. 1 depicts a vehicle mounted anti-vehicle electronic counter measure device 100 in use.

In a more modern vehicle, like an automobile, there are three systems, which control the operation of the vehicle. In order to stop or slow the vehicle, any one of these systems may be disrupted. With the destruction of any of these systems, the automobile will either be unable to proceed at great speed or be stopped. In either case, the loss of power is less dangerous than the flat tire or other stopping device.

An electromagnetic pulse generator can be placed close to a vehicle desired to be disabled. The pulse generator generator can then be activated. The resulting damage occurs only in the pursued vehicle. An inductance based generator is especially useful. However, a capacitance based generator is preferred.

Of primary importance to the anti-vehicle electronic counter measure device of this invention is a capacitor discharge device. The capacitor discharge device can apply a current to the undercarriage of a vehicle, which will disable or destroy any one or all of these critical systems.

It is also possible to mount the capacitor discharge device on a police squad car or similar vehicle. Included in that vehicle mounted device is a launch mechanism for launching a platform including the capacitor discharge device. The platform is positioned under the pursued vehicle. As that platform reaches the vehicle pursued, and particularly the undercarriage, the platform may then be activated from the squad car. Contact by two electrodes with the undercarriage of the vehicle at the appropriate points results in the appropriate electrical systems being deactivated.

Most police officers are highly skilled drivers. Those skilled drivers indicate that it is no problem to maintain a position behind a pursued vehicle in range of a launched device. With two wires forming the arms of an isosceles triangle, the front bumper of the pursuit vehicle forming the base of the triangle and the platform forming the vertex thereof, the platform is easily guided under the pursued vehicle. The isosceles triangle basis of the wire guiding of this device permits the platform to adjust with the speed of the vehicle. As the platform proceeds under the vehicle, the platform may be activated and disable the vehicle being pursued.

With regard to a fixed vehicle disbling device, current police tactics can permit a herding or a guiding of the pursued vehicle to a fixed disabling device of this invention. This structure permits certain areas to have at least one of these devices secured to a particular, to be activated as the pursued vehicle is herded thereover.

The wire system may also be modified to a parallelogram by attaching the guide wires further apart on the platform. This is possible by providing an extension bar across the front, rear or mid section of the platform.

Determination of vehicle electrical system and subsystem susceptibility to electronic-based vehicle disablement means indicates the platform of this invention is highly operable. This conclusion results from an investigation of the effects of overvoltages, current pulses, and electromagnetic field interactions with vehicle electronic engine controls (EEC) and sensors. Testing, simulation, and modeling do confirm the susceptibility thresholds and parameters. Typical of these parameters are amplitudes, waveform characteristics, and overall energy levels required to disrupt or disable target vehicles.

Commercial automotive electronics designers are aware that the increased use of microelectronics in automotive control and communications systems makes commercial automobile systems susceptible to electromagnetic disruption, failure, or upset. Currently, standards are being developed by the industry and concerned agencies that require automotive vehicle susceptibility to electromagnetic and electrostatic effects to be tested (for example SAE J1595, "Electrostatic Discharge Tests for Vehicles" and SAE "Electromagnetic susceptibility Measurement Procedures for Vehicle Components [Except Aircraft]").

Other proprietary test programs are also conducted by all of the major automotive manufacturers. All of these tests use low to moderate energy levels. Typical electronic static device (ESD) test levels are 2 to 15 kilo volts, with up to 250 picofarads of capacitance (charge storage) limited by a 1 to 2 kilo ohm resistance, which result in less than 0.03 Joules of energy with current limited to 15 amperes. Electromagnetic field strengths are nominally around 200 volts per meter (V/m) or less using continuous wave (CW) testing.

These test levels are sufficient to simulate the inadvertent discharges caused by an electrostatically-charged driver or occupant, or driving under most power lines and transmission towers. They are also adequate to provide compatibility with automobile citizens band and cellular communications systems, but do not even come close to matching the disruptive effect caused by high energy electrical pulses (EMP) of the type used in military test programs or the inventive subject matter herein.

These levels must be exceeded in order to disable a vehicle. Yet, the excess level must be insufficient to damage surrounding vehicles or electronic devices, which are most desirably maintained in their normal functions. This factor occurs within certain parameters.

The vehicle disabling device preferably provides a charge to the vehicle of about 20 to about 450 kilo volts to the vehicle. More preferably, the vehicle disabling device preferably provides a charge to the vehicle of about 30 to about 400 kilo volts to the vehicle. Most preferably, the vehicle disabling device preferably provides a charge to the vehicle of about 40 to about 350 kilo volts to the vehicle to be disabled.

The vehicle disabling device further provides up to about 5 microfarads of capacitance limited by about a 1 to about 2 ohm resistance, which results in less than 1000 Joules of energy with current limited to about 15,000 amperes. More preferably, the vehicle disabling device further provides up to about 4 microfarads of capacitance. Most preferably, the vehicle disabling device further provides up to about 3 microfarads of capacitance.

The vehicle disabling device further provides an electromagnetic field strength of about 100,000 to about 900,000 volts per meter. More preferably, the vehicle disabling device further provides an electromagnetic field strength of about 150,000 to about 800,000 volts per meter. Most preferably, the vehicle disabling device further provides an electromagnetic field strength of about 200,000 to about 750,000 volts per meter.

With regard to a static or stationary device, remote activation is preferred. A remote line-of-sight or cell area radio link is used to effect stand-off or remote control. A coded transmission is received through a small internal antenna and directional coupler means. The receiver acquires (tunes) and demodulates the radio frequency (RF) remote link control signal, which compares the receiving command to a prestored digital validation code and which, in turn, is contained in the decode key.

This method, for activating a stationary device, provides a level of protection against unauthorized operation or intentional spoofing or jamming. The two basic decoded commands are "arm" and "fire". Upon receipt of a valid "arm" command, a link-enable output is produced which provides the charge-enable signal to the charge generator section.

The charge generator is any suitable voltage multiplier. Preferably a Kocroft-Walton voltage multiplier available from any electrical supply source, which is driven by a switchmode power supply and high frequency set-up transformer configuration which produces a voltage charging ramp across the high voltage charge storage capacitors contained in the charge storage circuit block.

The critical automotive electronic systems subject to electrical disruption/destruction are very well protected against normal electrical system transients ranging from "alternator load dump" to static electricity discharges from passengers sliding across plastic seats. Such transients normally involve peak power levels in the range of tens to perhaps a few thousands of watts, and energies ranging from a few thousandths of a joule to a few joules. To reliably disrupt an automotive electrical system, energy levels of at least an order of magnitude greater than the maximums stated above must be effectively coupled into the "victim" modules or platform.

Two methods of accomplishing this desired result are known. The first method involves direct electrical contact with the offending vehicle, while the second employs inductive or capacitive coupling to the same. Both methods involve an energy storage means (preferably a high voltage capacitor), which is discharged to provide a very brief about 30 to about 400 kilo volt, but very energetic current flow through the automobile frame and therefore through attached electronic modules.

The direct contact preferentially pumps the electrical contents of the energy storage capacitor between the engine/transaxle and the vehicle under carriage/unibody. As the vehicle passes over the contact block, an arcing contact occurs to the vehicle parts mentioned, inducing a current flow limited only by the impedances involved; namely:

$$Z=(L/C)^{0.5}+R$$

and $I=V/Z$ with L being the sum of the inductance for the bonding wire, the contact block, and the feeder cable inductance; R being the sum total of the arc resistance and the capacitor equivalent series resistance; C being the capacitance of the energy storage capacitor (ESR), I being the current in amps, and V being the voltage.

Assuming equal inductance in the three items above and small total resistance, nearly one-third of the capacitor charge voltage will appear across the bonding wire between engine and body and therefore between engine-mounted modules (such as the engine control computer). The available current is limited only by the circuit impedance described above. Typical circuit values are:

|  | $C = 5$ micro Farad; |
|---|---|
| (total) | $L = 5$ micro henry; |
| (total) | $R = 0.2$ OHM. |

So $Z=(L/C)^{0.5}+R=(5\times10^{-6}/5\times10^{-6})^{0.5}+0.2=1.2$ ohms. Assuming 30 kilo volts direct current (KVDC) capacitor charge potential, peak currents may reach 24,000 amps. Under the conditions given above a "tank circuit: with resonant frequency of $F=[2pi(L/C)]^{-1}=30$ kilohertz results.

The frequency or "Q" of this circuit is $X_L/R=5$ causing a "damped wave" oscillation to result which dies away in a few cycles. This brief, high level oscillatory current has been found to short, open or actually vaporize electronic components used in typical automotive modules, including the protective components used to attenuate normal transients such as zener diodes and metal oxide varistors.

Another operable method is identical to first method except that instead of direct arcing contacts ohmically transferring energy to the vehicle a wire loop of similar dimension to vehicle length and width is placed on the pavement, and when the offending vehicle is driven over same, a high voltage (H.V.) switch means (for example, triggered spark gap) is closed discharging the energy storage capacitor and setting up a powerful damped wave current oscillation in the loop, which sets up a similar current in the vehicle body, by transformer action (magnetic field interface). However, not all flux lines from the loop (primary) impinge upon the vehicle body (secondary). Similarly, a capacitively coupled system can be used.

More energy is needed in this method by a factor of roughly ten from experiments to date. System cost, of course, rises with energy storage level. An additional complication of this method is that some external vehicle position sensor must accurately and quickly trigger energy release when the vehicle is directly over the loop or capacitive coupled device. This can take the form of an optical, capacitive inductive or even pneumatic sensor.

The first method is entirely self-triggering. No energy discharge occurs until the vehicle in question physically completes the electrical circuit. Clearly the second method is not only more expensive but more complicated as well.

The true worth of this second method can only be realized in a situation where electrical safety is an overriding concern. Since all high voltage components including the exposed delivery loop can be well insulated accidental electrocution of the operator, innocent by-standers, for example, are virtually eliminated. Regardless, safety precautions such as radio or fiber optic-isolated control and ground-fault interrupter circuitry to quickly "dump" the stored energy safely into a resistor are considered mandatory for total safety from the lethal energies used within either method.

Waveform Generation and Target Vehicle Coupling Electrodes trigger the platform. The trigger command signal enables the pulse switching circuits in the waveform generator and applies a very high voltage potential to the coupling electrode and return electrode. As the leading edge of the target vehicle passes over the electrodes, a series of high energy discharges are coupled to the engine, transmission, oil pan, and frame, creating a high electrical potential between the engine block and the vehicle frame.

Each discharge pulse has a rapid rise and fall time of about 30 nanoseconds and a duration of less than 3 microseconds. The peak power level of each discharge is over 1 megawatt and the total energy delivered to the target vehicle is a nominal 100 Joules at peak currents exceeding 5,000 amperes. As the high voltage discharge occurs, the combined inductance and capacitance of the engine compartment structures, such as the engine-to-frame/body grounding strap, battery return cable, and sensor leads, will cause electrical "ringing" or secondary waveforms to be coupled to the automobile electrical system. The oil pan and frame structure will also behave as electromagnetic radiating structures that will couple electromagnetic near-field radiation to the sensor leads.

The EEC module of the target is located on the firewall or other vehicle location, is electrically connected to the engine block and sensors, and will experience high amplitude overvoltages and false sensor inputs. The EEC module will either be destroyed or will function incorrectly and halt the vehicle.

Even if the EEC module resets itself and recovers, if critical engine sensors have been destroyed, its embedded software will shut down the engine and prevent vehicle restart. Other systems, such as the ignition switching and electronic transmission controls, may be disabled as well. As the power train is disabled, the vehicle will either roll to a stop as its kinetic energy dissipate, or traditional barrier means may be employed to limit forward travel distance and to reduce penetration range.

Figure 4:
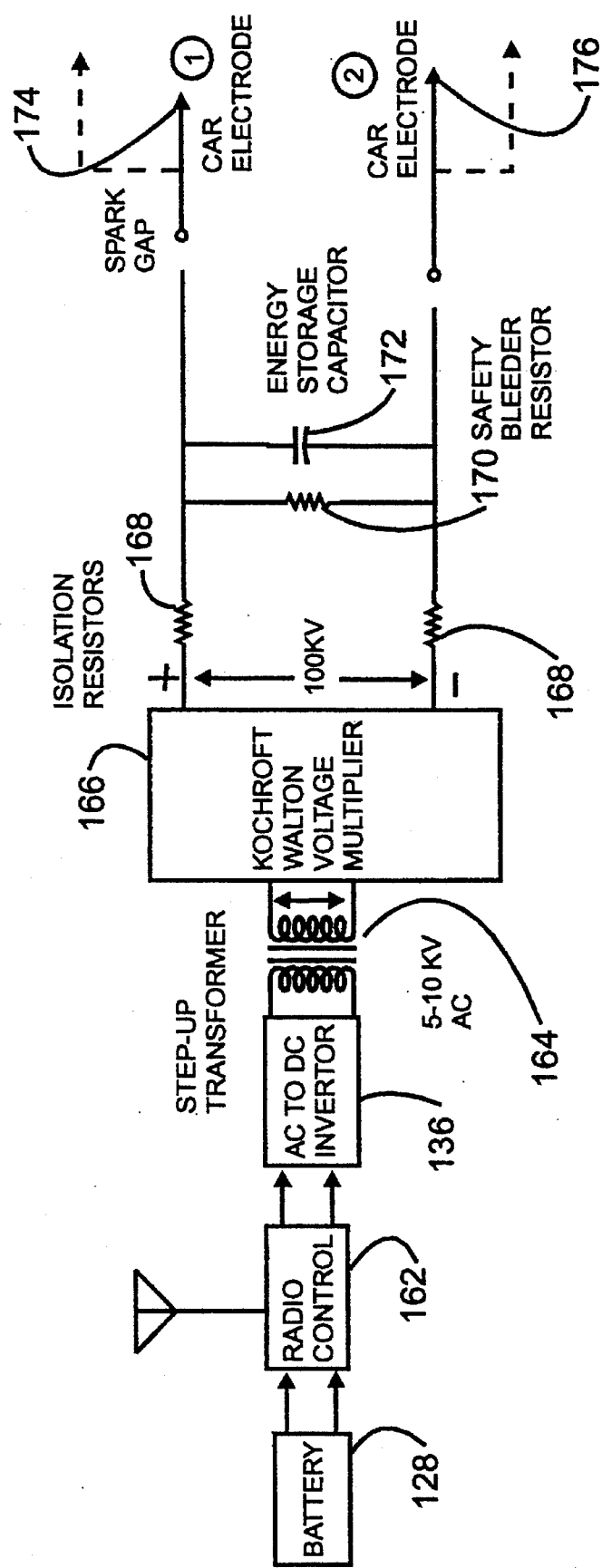
FIG. 4 depicts a modification of FIG. 3 to a roadway mounted circuit diagram 116 for vehicle mounted anti-vehicle electronic counter measure device 100.

Preferably, the platform or AVECM device is housed in a light-weight, high-strength polycarbonate low-profile case. The configuration and coloring of this case makes it appear non-threatening to an oncoming vehicle operator; it appears as a mere "bump" in the road. The high voltage electrodes are thin and difficult to see. Their protrusion above the case is minimal (FIG. 4). The use of modern electronics and engineering material can make the AVECM device compact and light, weighing only approximately 20 kg. The power supply of the AVECM device can be light in weight and portable by using modern battery technology. For single-use systems, a thermal battery may be used with the battery "ignited" by the arming command upon approach of the target vehicle.

The light weight and compact configuration of the proposed AVECM device makes it truly man-deployable, unlike traditional barrier technology. The AVECM device can be carried in a light vehicle or small helicopter, ready to be deployed on a roadway, making strike evasion difficult or unlikely. Gates, vehicles, or other roadway impediments may be used to restrict the path of the vehicle and to guide it toward the AVECM device strike zone.

The AVECM device described above is only one of many design alternatives. The means of coupling energy can be capacitive or inductive, and discharge electrodes can also be employed. For installed perimeter defense systems, power can be provided by base power utilities and control can be by fiber optic or coaxial cables.

The vehicle energy-coupling means can actually be placed in the road surface by embedding metal capacitive "plate" or similar elements into thin composite materials made to look like common paving material, giving a blanket, wide-area effect. These plates can be organized into a matrix or array, allowing only specified areas to be energized selectively in order to target a specific vehicle in a line of traffic flowing past a check point.

Check points can even be automated using a radio frequency car security "tag" issued to authorized vehicles which respond with a coded message when interrogated with the modulated electromagnetic field of predetermined frequency and strength. If the tag response in incorrect, a lighted warning to stop could be issued concurrently with arming the AVECM charging circuits. If the vehicle continues forward progress and reached the restricted zone, the AVECM device could be triggered, automatically disabling the vehicle. Unlike conventional check points, vehicles can be "cleared" without even requiring authorized vehicles to come to a complete stop.

AVECM technology minimizes the hazards associated with traditional barrier technology and/or high-speed pursuits by law enforcement personnel. The AVECM device requires neither the physical disruption of the target vehicle nor injury to its driver or occupants. The use of coded control signal would make unauthorized operation difficult. The short duration of pulses and brief duty cycle of operation required limits electromagnetic interference with collocated communications systems. The AVECM device uses only near-field coupling and will not affect even sensitive electronics systems, such as radiated micro systems, located only a few meters away.

Ignition of fuel tanks is very unlikely, as minimal heating effects are produced. Pre-detonation of on-board explosives is possible, but very unlikely, as the AVECM device is to be designed to couple its energy to the engine compartment and not to the payload of a vehicle. Unless the explosives were actually wired into the automotive electrical system, sufficient energy is not available to trigger most electronic bomb detonation systems.

The voltage and current amplitudes used by a typical AVECM device do pose an electrical shock hazard to any personnel or bystanders making direct contact with coupling electrodes. For this reason, the preferred design incorporates a charge dissipation circuit to remove rapidly the hazardous stored energy after the arming or fire sequence is performed.

In particular the static or stationary automobile killer, or the vehicle disabling device includes a battery, a radio controller, a DC to AC inverter, a step up transformer, a voltage multiplier, two resistors, a safety or bleeder resistor, a storage capacitor, and a pair of car electrodes. More particularly, the battery is connected to the radio receiver in a standard fashion. The radio controller operably connected to the DC inverter and provides for control and operation of the static car killer. The DC to AC inverter is connected to the step up transformer to provide five to ten kilo volts of alternating current.

That current is then multiplied into a negative and positive kilo voltage through isolation resistors. Preferably, the voltage is about 30 kilo volts to about 400 kilo volts. More preferably, the voltage is about 50 kilo volts to about 140 kilo volts. Most preferably, the voltage is about 90 kilo volts to about 110 kilo volts.

The isolation resistors have a resistance in a range of about five to about forty kilo ohms. More preferably, the isolation resistors have a resistance in a range of about ten to about thirty kilo ohms. Most preferably, the isolation resistors have a resistance in a range of about ten to about twenty kilo ohms.

A safety bleeder resistor connects the two resistors from the voltage multiplier. An energy storage capacitor is connected in parallel with the safety bleeder resistor and in series with each isolation resistor. A spark gap is connected to each car electrode. As the automobile closes the gap between the electrodes, the disabling current is fired through the automobile.

This device can fire immediately on contact with the vehicle. It fires repeatedly and quickly so that eventually critical disabling contact can be made with the underside of the vehicle. Thus, the device does not require precise positioning before fired. Similarly, a stationary device can fire repeatedly within fractions of a second and have the same results.

Any suitable method may be used to launch the anti-vehicle electronic counter measure. It may be launched by a spring mechanism, a hydraulic ram, or expanding gas. The platform may also be launched by mortar device or a traction motor device. Most preferred, however, is a rocket based launch with wire controls. The rocket is preferably a solid state fueled single use rocket. Such a rocket is a commonly available item and easily adapted for the use herein.

In the vehicle launch embodiment, the device is mounted on a platform; which, is in turn, mounted on the vehicle. Upon activation of a launch device, a rocket can fire the platform containing the anti-vehicle electronic counter measure device. The position platform is controlled by cables.

The cable is mounted in any suitable fashion. Preferably two cables are used and proceed from each end of the front bumper of the pursuit vehicle. Each cable may be mounted on a double reel, with a centrifugal brake to control the speed of the required substantially equal payout of each cable. The two cables may also be formed by splitting a joined cable and ejecting the platform as required.

In this vehicle launched mode, the platform for the electrode assembly has a rocket mounted thereon and is mounted on wheels. The rocket is wire guided to the desired target. Information from various police officers indicate that it is no problem to stay an appropriate distance behind the vehicle being followed, for the required period of time, usually about three to five seconds.

The sled or platform containing the vehicle disabler is mounted on wheels and guided by a wire control. The sled is propelled by a rocket. A mechanical or fuse link release system releases the platform and ignites the rocket. The five second timer arms the rocket and permits the fire switch to ignite the rocket. Upon igniting of the rocket, the power is provided through an inverter to a dual cable reel.

Each cable forms an arm of a isosceles triangle with the disabling device at the front portion thereof. In this particular case the inverter remains with the automobile while the step up transformer is mounted on the rocket platform. This is the basic division of the switch activation to control activation of the disabling device. With the inverter and the multiplier, there is a voltage regulator and bleeder resistors operationally connected to the isolation resistors and the energy storage capacitor.

Each cable may also form parallel sides of a parallelogram. The front bumper of a pursuit vehicle and the launched platform form the other pair of parallel sides.

The voltage regulator permits control of the voltage and prevents excess voltage from reaching the capacitors. By this means, an electronic switch is opened, when the regulator detects adequate capacitor voltage, and acts to reduce energy passing to the voltage regulator and thence to the capacitor.

Referring now to FIG. 1, the anti-vehicle electronic countermeasure device 100 is launched from pursuit vehicle 110 toward a pursued vehicle 112. Preferably the front bumper of the pursuit vehicle 110 forms the base of an isosceles triangle while the anti-vehicle electronic countermeasure 100 forms the vertex of the isosceles triangle. A first wire guide mechanism 120 and a second wire guide mechanism 122 form the arms of the isosceles triangle. As the pursuit vehicle 110 changes position, the anti-vehicle electronic countermeasure 100 form can be maneuvered toward the pursued vehicle 112. After the vehicle mounted device 100 is under the pursued vehicle 112, the device 100 may be activated and the pursued vehicle 112 disabled.

Figure 2:
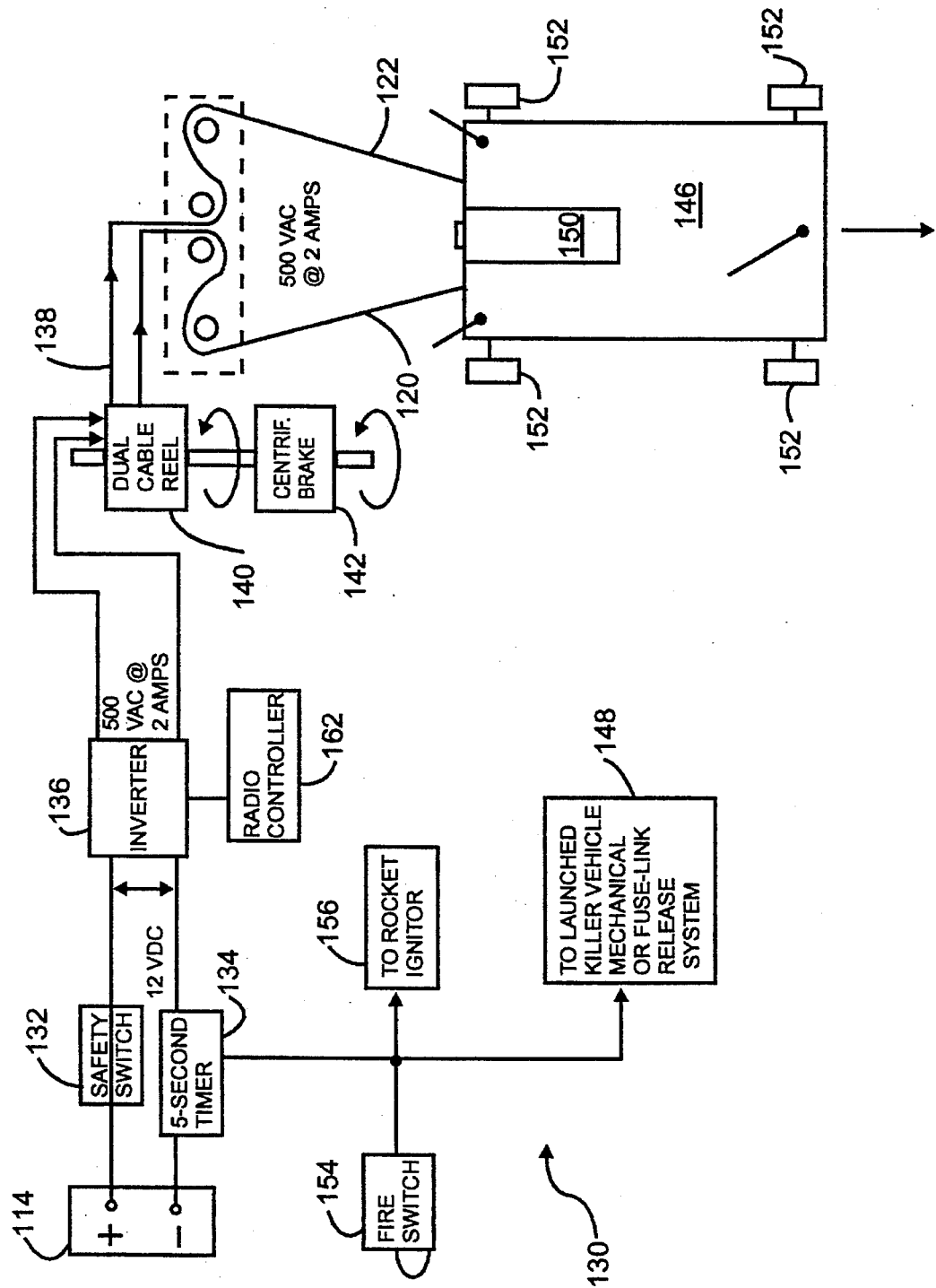
FIG. 2 depicts a vehicle mounted anti-vehicle electronic counter measure device 100 in block diagram form.

Now adding FIG. 2 to the discussion, the structure of the vehicle mounted anti-vehicle electronic countermeasure device 100 is more clearly defined. The launching mechanism 130 is depicted in block diagram form. The launching mechanism 130 is wired to the battery 114 of the pursuit vehicle 110.

Wired in series with or otherwise connected to the battery 114 is a safety switch 132 and a timer 134. These devices are wired to an inverter 136 which can convert the 12 volt DC from the battery 114 to 500 volts AC current at 2 amps. The inverter 136 is, in turn, connected to a cable 138 through dual cable reel 140. Dual cable reel 140 is, in turn, controlled by a centrifugal brake 142.

The dual cable reel 140 provides a coil of cable 138 connected to a rocket sled 146. The rocket sled 146 has mounted thereon the anti-vehicle electronic activation system 148 of FIG. 3 for the anti-vehicle electronic countermeasure 100. The cable 138 is fed out as the rocket motor 150 ignites burns and propels the sled 146 on wheels 152. Cable 138 divides into first wire guide mechanism 120 and second wire guide mechanism 122.

Within the pursuit vehicle 110 and wired to the five (5) second timer 134 is a fire switch 154 connected to a rocket igniter 156. This five (5) second timer 134 controls the duration of power delivery to the rocket sled 146.

Figure 3:
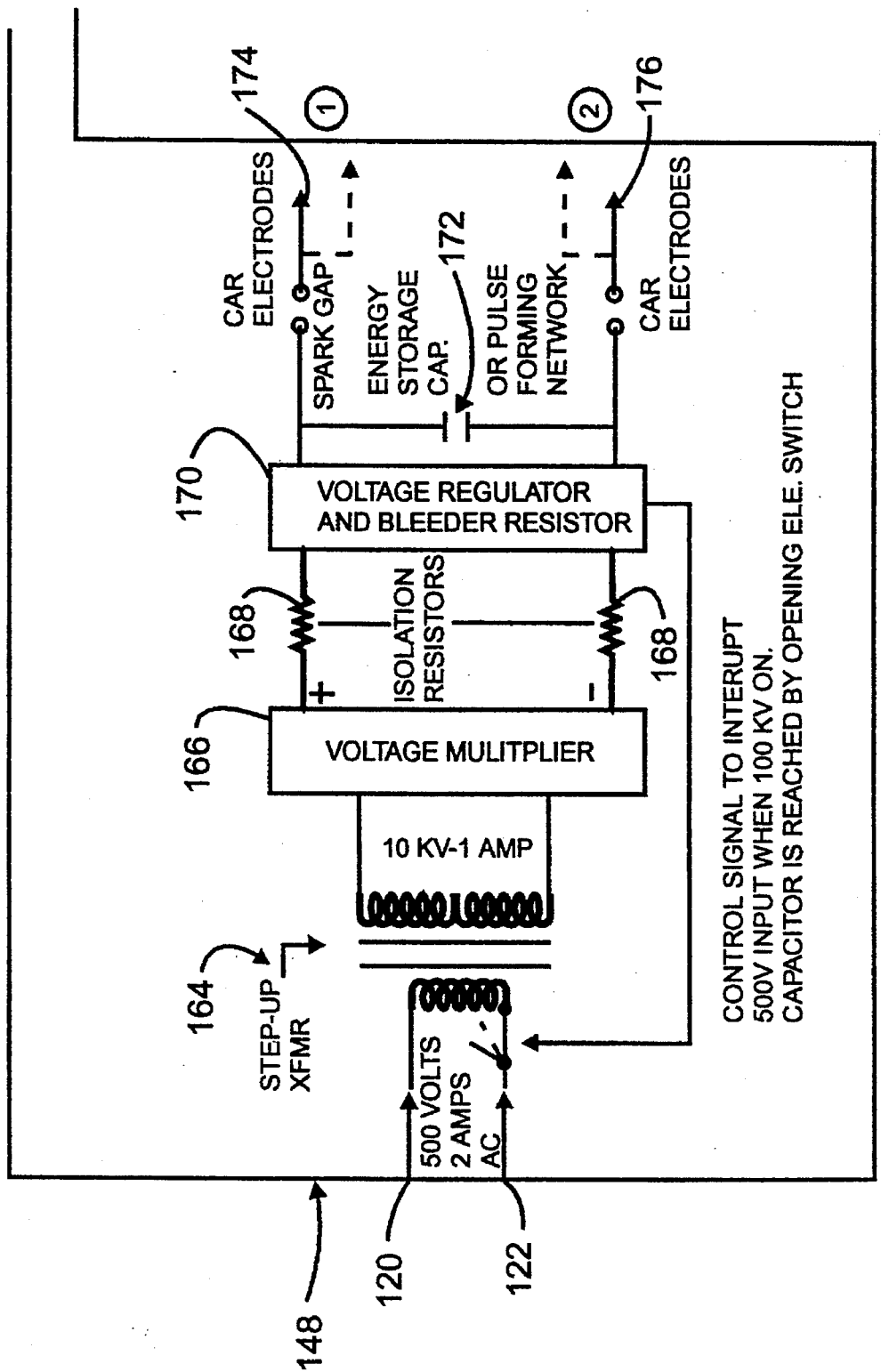
FIG. 3 depicts a vehicle circuit diagram 118 for vehicle mounted anti-vehicle electronic counter measure device 100.

Adding FIG. 3 to the consideration, the actual structure of the anti-vehicle electronic activation system 148 on the rocket sled 146 may be seen. The battery 114 within the pursuit vehicle 110 provides power to the system. Radio controller 162 is connected to the inverter 136. The inverter 136 is connected to a step up transformer 164 and a voltage multiplier 166, which increases the voltage to about 100 kilo volts direct current.

A FIG. 4 modification shows that the high voltage direct current is fed through a pair of isolation resistors 168 from platform battery 128. The isolation resistors 168 are connected a safety bleeder resistor 170 and to the energy storage capacitor 172. Leading from the energy capacitor 172 are first car electrode 174 and a second car electrode 176. As the rocket sled 146 goes under the pursued vehicle 110, the electrodes 174 and 176 contact the undercarriage thereof. The radio controller 162 may then activate the electrodes and disable the electronics within the pursued vehicle 112.

Most preferably the step up transformer 164 drives a Kocroft Walton voltage multiplier. The voltage multiplier 166 takes the 5 to 10 kilo volts AC out of the step up transformer 164 and increases the voltage level to 100 kilo volts. In this fashion, enough energy is created to permit the electronic engine controls (EEC) of pursued vehicle 112 to be disabled.

Figure 5:
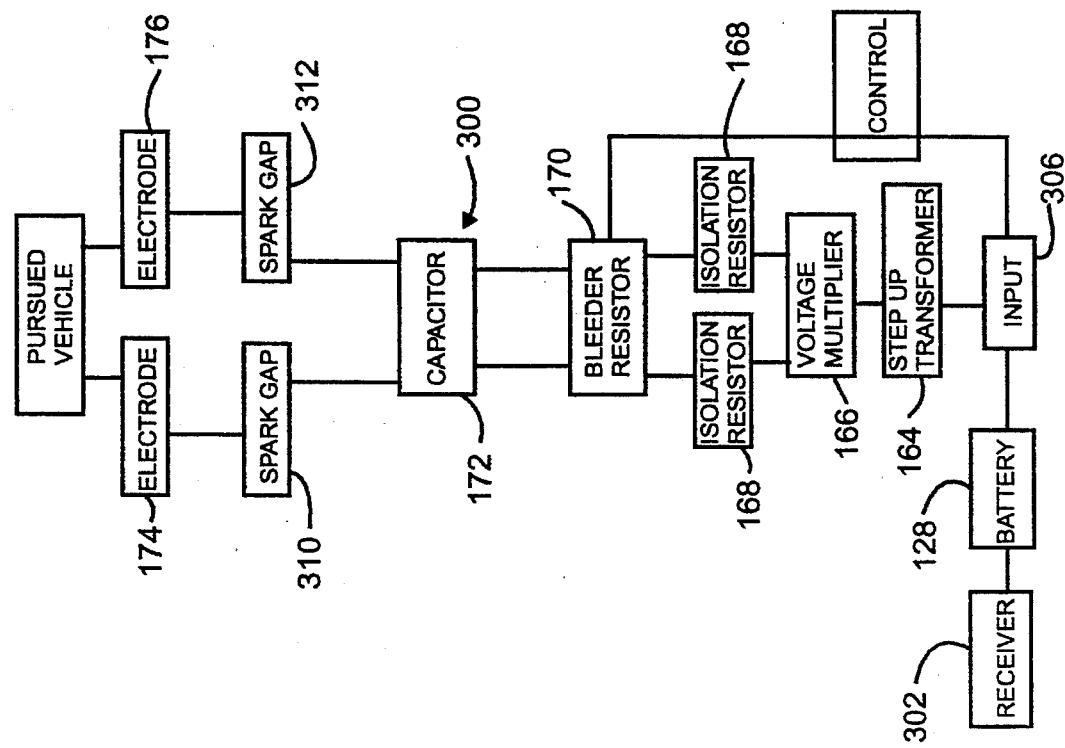
FIG. 5 depicts a portable anti-vehicle electronic counter measure device 300 in block diagram form.

As depicted in FIG. 5, portable anti-vehicle electronic counter measure device 300 may placed in a roadway and used as desired. The structure is very similar to FIG. 3. Radio receiver 302 or a similar device is connected to the battery 128, which operates the initial voltage input 306. The initial voltage input 306 is connected to a step up transformer 164 and a voltage multiplier 166, which increases the voltage to about 100 kilo volts direct current.

The kilo volts are fed through a pair of isolation resistors 168. The isolation resistors 168 are connected to a safety bleeder resistor 170 and to the energy storage capacitor 172. Leading from the energy capacitors 172 are first car electrode 174 through first spark gap 310 and a second car electrode 176 through spark gap 312. The radio receiver 302 may then activate the electrodes, and disable the electronics within the pursued vehicle 112, when it passes thereover.

Figure 6:
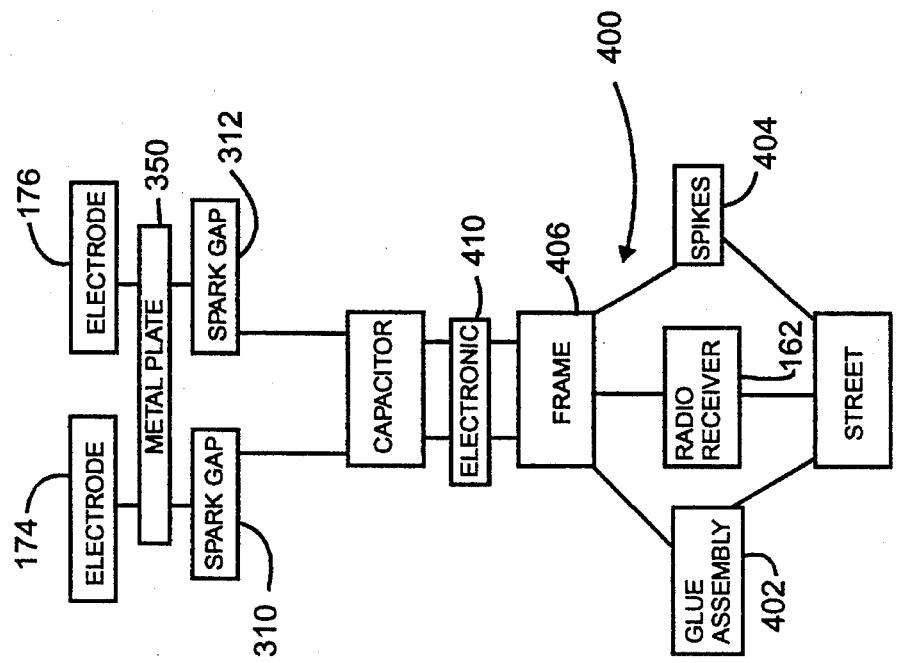
FIG. 6 depicts a stationary anti-vehicle electronic counter measure device 370 in block diagram form.

The stationary anti-vehicle electronic counter measure device 400 of FIG. 6 is similar to FIG. 5. Glue assembly 402 or spikes 404 in frame 406 lock stationary device 400 in place. The radio receiver 162 may be activated by remotely operated device from pursuit vehicle 110 or an officer in a vehicle or on foot, in a standard fashion.

Figure 7:
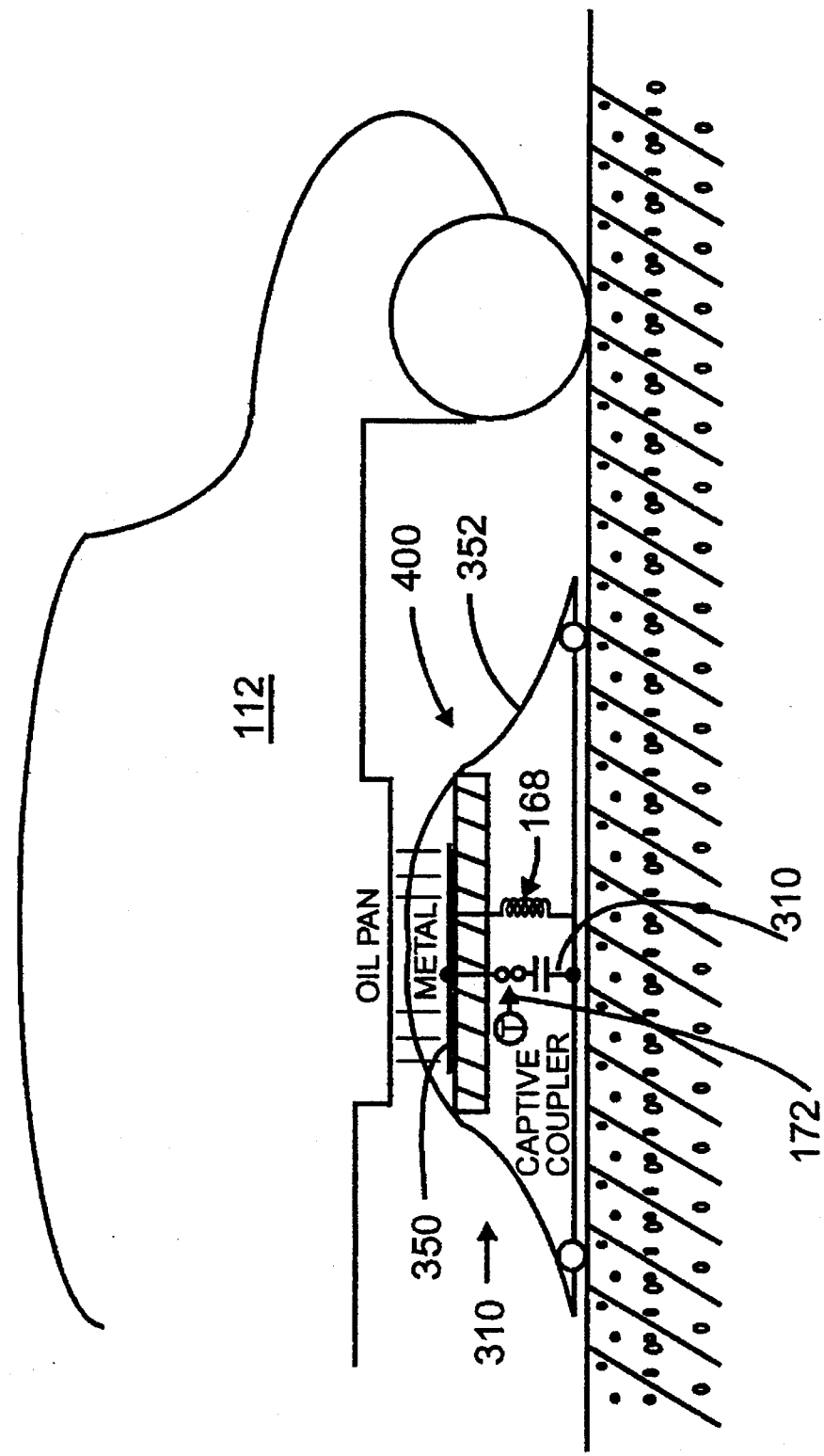
FIG. 7 depicts a stationary circuit diagram 310 for stationary anti-vehicle electronic counter measure device 370.

FIG. 7 depicts a stationary circuit diagram 310 for a capacitively coupled anti-vehicle electronic counter measure device 400. A metal plate 350 causes a capacitive coupling and thus current to flow to a pursued vehicle 112. The spark gap and capacitor 172 with the isolation resistors 168 are encased in a plastic coating 352. The device 400 may then be placed as desired and activated when necessary.

Figure 8:
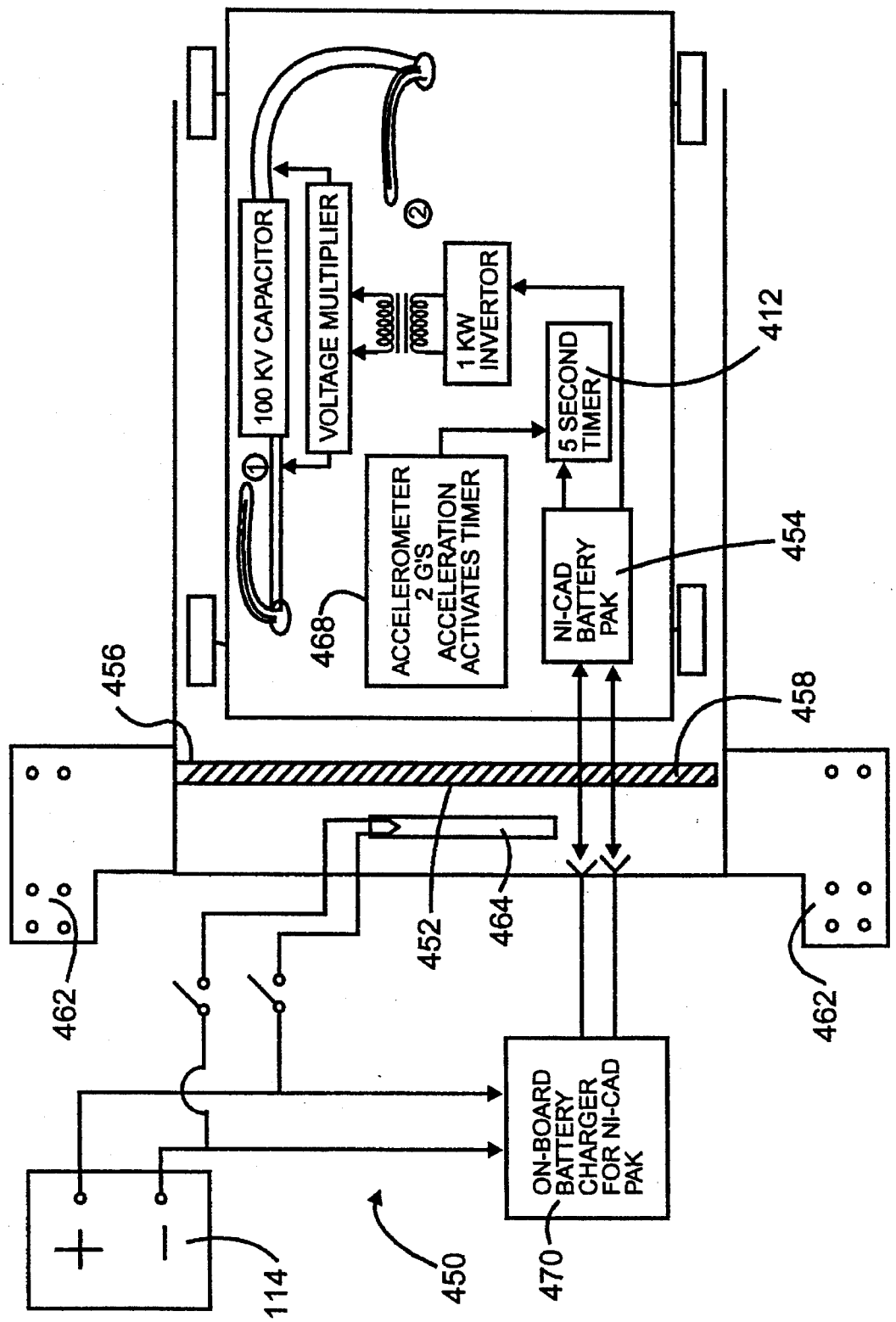
FIG. 8 depicts a partial block diagram of mortar-launched, anti-vehicle electronic counter measure device 400 of this invention.

Referring now to FIG. 8, the mortar launched anti-vehicle electronic countermeasure device 450 is depicted. This device 450, while operable, is not as efficiently controlled as the rocket launched vehicle mounted anti-electronic countermeasure device 100. The mortar 452 provides for a faster acceleration. However, the accurate speed control of device 100 is more usually preferred. Again this mortar launch device 450 is mounted on the police car or pursuit vehicle 110.

It is controlled by a typical mortar launch device 450 mounted in a mortar 452 attached to pursuit vehicle 110, capable of providing for more accurate firing mechanism. The mortar device 450 includes a nickel cadmium battery pack 454 which is charged by through charger 470 by the battery 114 on the pursuit vehicle 110 until the device 450 is launched.

The launch tube 456 for mortar 452 is mounted on a sabot 458 in an angled mounting bracket 462. There is an appropriate propellant charge 464 for launching the disabling device 450. High pressure gases generated from the ignition of propellant charge 464 are sealed by sabot 458.

The mortar-caused acceleration activates the timer 412 and the other features of the device by an impact switch 468 or similar device. The timer 412 activates elements similar to elements on the rocket launched electronic device 100. Thus, the kilo volt inverter 136, the step up transformer 164 and the voltage multiplier 166 used herein are similar.

The timer 412 also effects the activation of the electrodes. This launch must be timed, as the electrodes are activated by the timer 412 and the appropriate vehicle contact. Once launched, this mortar device 400 has greater speed than the device 100. However, the mortar device 400 lacks the control, maneuverability and flexibility of the device 100.

Figure 9:
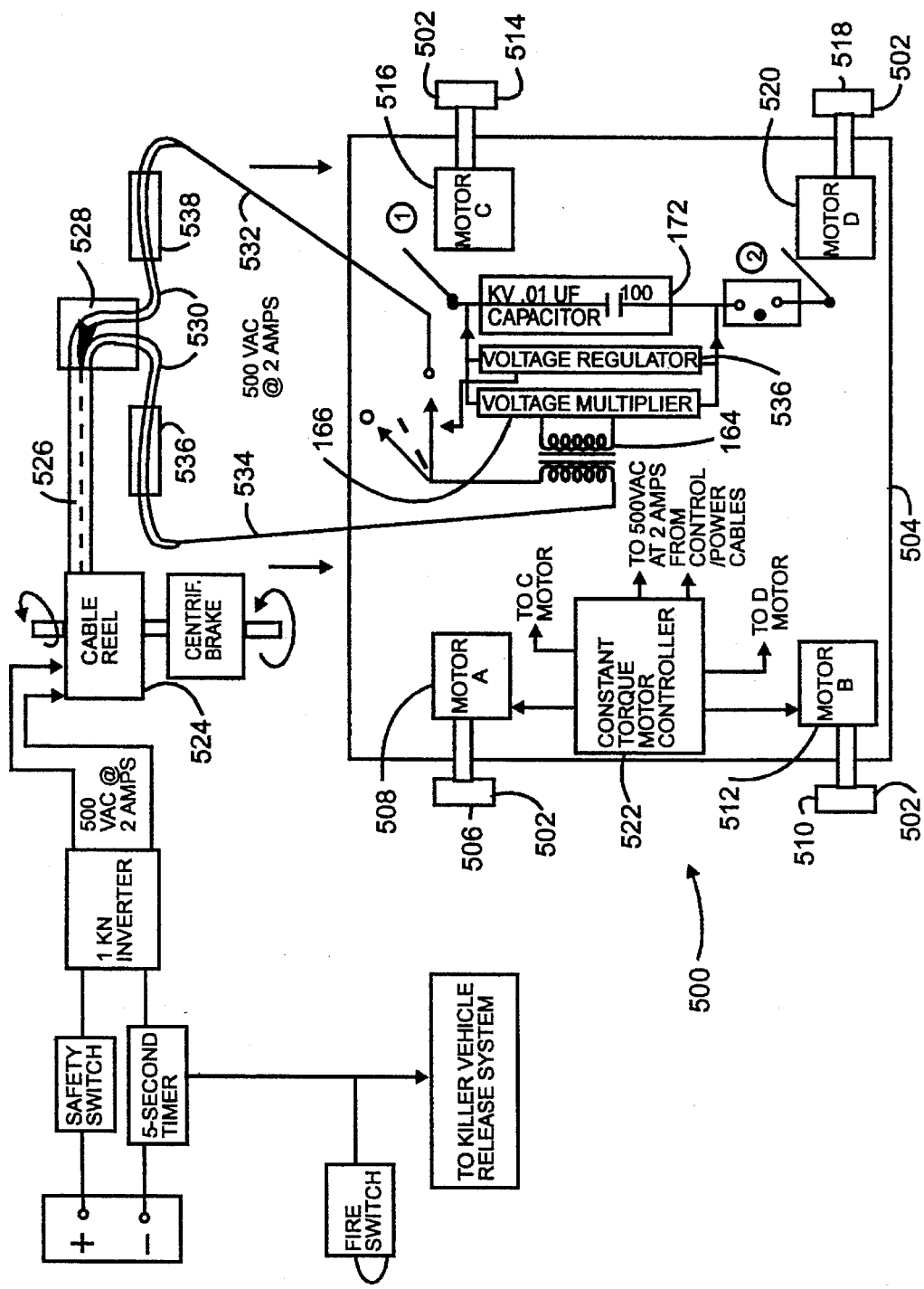
FIG. 9 depicts a partial block diagram of traction-motor launched, anti-vehicle electronic counter measure device 500 of this invention.

In FIG. 9, traction-motor launched, anti-vehicle electronic counter measure device is depicted. Traction motor device 500 is distinguished by four traction drive wheels 502 on each corner of the traction sled 504 to carry the electronic disabling device 100. The four traction drive wheels 502 are mounted in a typical vehicle fashion and spaced equivalently apart.

The first traction drive wheel 506 is operated by first motor 508. The second traction drive wheel 510 is operated by second motor 512. The third traction drive wheel 514 is operated by third motor 516, while the fourth traction drive wheel 518 is operated by fourth motor 520. Constant torque controller 522 is operably connected to each motor to provide torque control and to keep the motors at a constant torque output independent of speed. Vehicle speed is regulated by the centrifugal brake.

The cable reel 524 of this device includes a joined cable 526. Mounted adjacent to the cable reel 524 is a knife 528 for separating the joined cable 526 into separated cable 530 to form the above described isosceles triangle or parallelogram with first cable arm 532 and second cable arm 534. The separated cable 530 passes through a first solid mounted, tetrafluoroethylene-coated (sold under TEFLON a registered trademark of E. I. dupont, Wilmington, Del.) low friction sleeve 536 and a second low friction sleeve 538 (FIG. 10).

Within the joined cable 526, of course, is the control of the traction motor device 500 and power delivery for the electronic disabling device. Control of the traction sled 504 then becomes similar to device 100 in that the first cable arm 532 and second cable arm 534 feed into a step-up voltage transformer 164, which in turn go to a voltage multiplier 166 and then to a voltage regulator 536. The voltage regulator 536 is connected to the capacitor 172, which reaches the car electrodes and provides for the firing power to stop the pursued vehicle 112. Joined cable 526 and the structure therewith may also be used with other embodiments disclosed herein.

Figure 10:
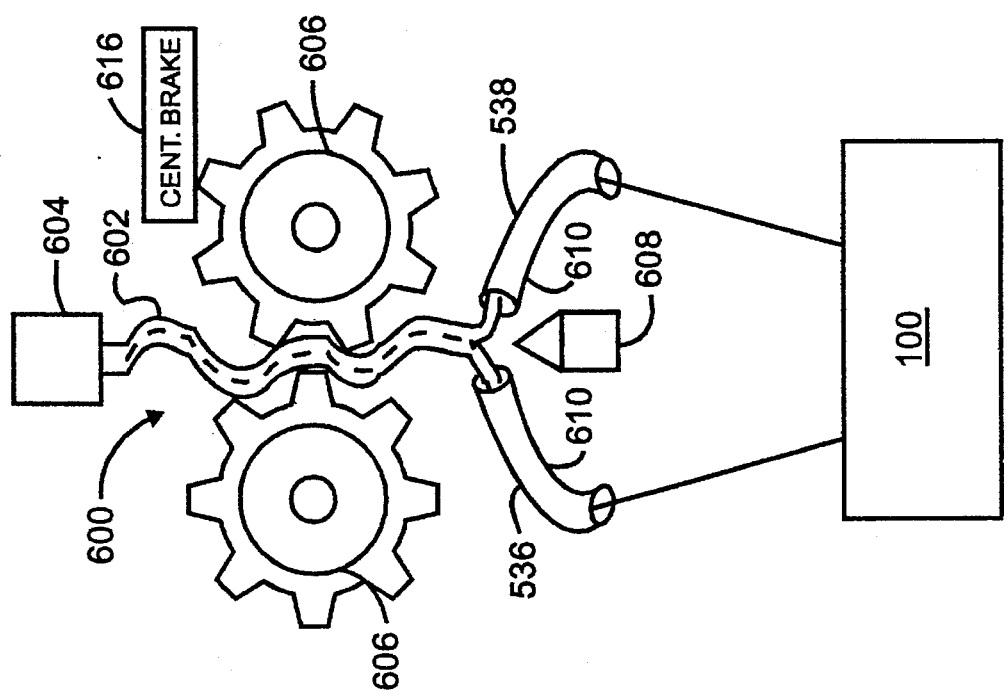
FIG. 10 depicts a crimped wire guidance system 600 for vehicle mounted anti-vehicle electronic counter measure device 100.

FIG. 10 provides a crimped wire guidance system 600 for good wire control related to vehicle mounted anti-vehicle electronic counter measure device 100. Two strand wire 602 is mounted on a reel 604. As the platform fires, wire 602 passes through a pair of crimping wheels 606 then to a blade 608. The blade 608 splits the wire 602 to form the parallelogram or isosceles triangle. The split wire passes through a pair of tubes 610 and to the platform. The crimping simplifies the wire payout control with a centrifugal brake 616 standardly mounted on one crimping wheel 606.

Figure 11:
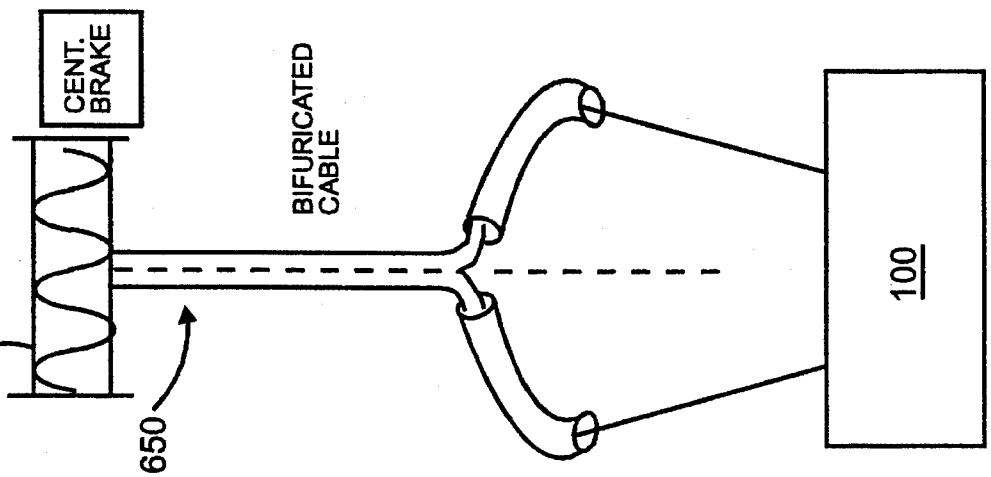
FIG. 11 depicts a hose wire guidance system 650 for vehicle mounted anti-vehicle electronic counter measure device 100.

FIG. 11 depicts a hose wire guidance system 650 for vehicle mounted anti-vehicle electronic counter measure device 100. The wire 660 is not on a reel, but is coiled in an S-coil 660 like a fire hose.

FIG. 12 depicts a splitable wire guidance system 700 for vehicle mounted anti-vehicle electronic counter measure device 100. Due to a bar 702 on the platform, a parallelogram of guidance is achieved. The other structure is similar to FIG. 10. However, no splitting knife such as knife 528 FIG. 9 is required This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A vehicle disabling device capable of contacting a pursued vehicle, sending an electrical discharge therethrough, and disabling at least one electric system of a vehicle; the vehicle disabling device including a platform and a disabling circuit mounted thereon; the vehicle disabling device further including:

(a) the disabling circuit including a electromagnetic pulse generating device;

(b) a positioning means for placing the vehicle disabling device under the pursued vehicle;

(c) a discharge means for activating the vehicle disabling device under the pursued vehicle;

(d) the discharge means providing sufficient power with low to moderate energy levels to disable only the pursued vehicle; and (e) a coupling means delivering the energy levels from the electromagnetic pulse generating device to the pursued vehicle.

2. The vehicle disabling device of claim 1, further comprising:

(a) the discharge means providing about 30 to about 400 kilo volts to the vehicle;

(b) the discharge means including a bonding wire, a contact block, and a feeder cable inductance; an arc resistance; and the electromagnetic pulse generating device being a capacitor equivalent series resistance; and a capacitance for an energy storage capacitor; and (c) a current flow from the discharge means to the vehicle being based on the formulas;

$$Z=(L/C)^{0.5}+R$$

$$I=V/Z$$

with L being is the sum of the inductance for the bonding wire, the contact block, and the feeder cable inductance; R being the sum total of the arc resistance and the capacitor equivalent series resistance; C being the capacitance of the energy storage capacitor, I being the current in amps, and V being the voltage.

3. The vehicle disabling device of claim 2, further comprising:

(a) the discharge means further providing up to about 5 microfarads of capacitance limited by about a 1 to about 2 ohm resistance, which result in less than about 1000 Joules of energy with current limited to up to about 150,000 amperes; and (b) the discharge means further providing an electromagnetic field strength of about 150 to 800 volts per meter.

4. The vehicle disabling device of claim 3, further comprising:

(a) a pursuit vehicle carrying the vehicle disabling device;

(b) a launching means for the vehicle disabling device mounted on the pursuit vehicle;

(c) the launching means cooperating with the vehicle disabling device and the pursuit vehicle in order to position the vehicle disabling device under the pursued vehicle; and (d) a firing means for activating the vehicle disabling device under the pursued vehicle.

5. The vehicle disabling device of claim 4, further comprising:

(a) the positioning means including a wire guidance system;

(b) the wire guidance system being connected at a first wire end to the pursuit vehicle and a second wire end to the platform; and (b) the wire guidance system providing the pursuit vehicle the means for positioning the vehicle disabling device under the pursued vehicle.

6. The vehicle disabling device of claim 5, further comprising:

(a) the wire guidance system including a first guide wire and a second guide wire; and (b) the capacitor discharge device being dischargeable a plurality of times while under the pursued vehicle.

7. The vehicle disabling device of claim 6, further comprising:

(a) the first guide wire and the second guide wire each forming an arm of an isosceles triangle as the platform is launched from the pursuit vehicle;

(b) the pursuit vehicle forming a base of the isosceles triangle; and (c) the platform forming a vertex of the isosceles triangle.

8. The vehicle disabling device of claim 6, further comprising:

(a) a first guide wire and the second guide wire each forming opposing parallel sides of a parallelogram as the platform is launched from the pursuit vehicle;

(b) the platform including a bar substantially parallel to a front bumper of the pursuit vehicle; and (c) the bar and the front bumper each forming opposing parallel sides of a parallelogram as the platform is launched from the pursuit vehicle.

9. The vehicle disabling device of claim 6, further comprising:

(a) the capacitor discharge device being connected to a first electrode and a second electrode; and (b) the first electrode and the second electrode serving to contact an undercarriage of the pursued vehicle and discharge the capacitor discharge device the plurality of times to disable at least one electrical system in the pursued vehicle.

10. The vehicle disabling device of claim 9, further comprising a remote control activation means.

11. The vehicle disabling device of claim 9, further comprising an automatic activation means.

12. The vehicle disabling device of claim 9, further comprising:

(a) the capacitor discharge device having a means to discharge the capacitor device and set up a damped wave current oscillation; and (b) the capacitor discharge device having a means to set up a current in the pursued vehicle body by transformer action.

13. The vehicle disabling device of claim 12, further comprising an activation means being at least one selected from the group consisting of an optical sensor, a capacitive sensor, an inductive sensor, and a pneumatic sensor.

14. The vehicle disabling device of claim 13, further comprising:

(a) a high voltage potential being conveyed to the pursued vehicle by the first electrode and the second electrode; and (b) the pursued vehicle contacting the first electrode and the second electrode and causing at least one of high energy discharge pulses to be coupled to an engine, a transmission, an oil pan, and a frame of the pursued vehicle to thereby create a high electrical potential between the engine and the frame.

15. The vehicle disabling device of claim 14 further comprising:

(a) the discharge pulse having a rise and fall time ranging from about 30 nanoseconds to about 3 microseconds;

(b) the discharge pulse having a peak power level in excess of 1 megawatt;

(c) the discharge pulse having a total energy delivered to the pursued vehicle of 100 Joules at peak currents exceeding 5,000 amperes; and (d) the discharge pulse causing a combined inductance and capacitance of the engine compartment structure resulting secondary waveforms to be coupled to the at least one electrical system.

16. The vehicle disabling device of claim 1 further comprising:

(a) a light-weight, high-strength synthetic resin low-profile case housing the vehicle disabling device;

(b) the low-profile case having a concealing color and shape in order to appear non-threatening to the pursued vehicle; and (c) the vehicle disabling device being activated by an arming command upon approach of the pursued vehicle.

17. The vehicle disabling device of claim 16 further comprising:

(a) a means of coupling energy for the vehicle disabling device that is at least one selected from the group consisting of a capacitive energy, an inductive energy, and discharge electrode energy;

(b) the vehicle disabling device being used for a perimeter defense system; and (c) the vehicle disabling device having a control means selected from the group consisting of a fiber optic cable or a coaxial cable.

18. The vehicle disabling device of claim 17 further comprising:

(a) a capacitor discharge device being a thin plate encased in a composite material and embedded in a road surface;

(b) the vehicle disabling device further including a battery, a radio controller, a direct current to alternating current inverter, a step up transformer, a voltage multiplier, two resistors, a safety or bleeder resistor, a capacitor, and a first electrode and a second electrode;

(b) the battery being operably connected to a radio receiver;

(c) the radio controller being operably connected to a direct current inverter to provide for control and operation of the vehicle disabling device;

(d) the direct current to alternating current inverter being connected to the step up transformer in order provide to provide five to ten kilo volts of alternating current; and (e) the two resistors multiplying the current to about 50 kilo volts to about 140 kilo volts.

19. The vehicle disabling device of claim 18 further comprising:
(a) the current being about 90 kilo volts to about 110 kilo volts; and
(b) the resistors having a resistance in a range of about five to about forty kilo ohms.

20. The vehicle disabling device of claim 19 further comprising:
(a) the resistor having a resistance in a range of about ten to about thirty kilo ohms;
(b) a safety bleeder resistor being connected to the two resistors from the voltage multiplier;
(c) the capacitor being connected in parallel with the safety bleeder resistor and series with each isolation resistor;
(d) a spark gap being connected to the first electrode and the second electrode; and
(e) a disabling current being fired at least once through a gap between the first electrode and the second electrode from contact by the pursued vehicle.

21. The vehicle disabling device of claim 20 further comprising:
(a) a plurality of the thin plate being formed into a defensive array capable of being selectively targeted; and
(b) means for secluding a thin plate to be targeted.

22. A vehicle disabling device mounted on a pursuit vehicle and capable of contacting a pursued vehicle, sending a capacitive discharge therethrough, and disabling at least one electric system of a vehicle; the vehicle disabling device including a platform and a disabling circuit mounted thereon; the vehicle disabling device further including:
(a) the disabling circuit including a capacitor discharge device;
(b) a positioning means for placing the vehicle disabling device under the vehicle;
(c) a discharge means for activating the vehicle disabling device under the vehicle;
(d) the discharge means providing sufficient power with low to moderate energy levels to disable only the vehicle; and
(e) a launching means for releasing the vehicle disabling device from the pursuit vehicle to the pursued vehicle.

23. The vehicle disabling device of claim 22 further comprising the launching means being at least one selected from the group consisting of a spring mechanism, a hydraulic ram, an expanding gas, a mortar device, a traction motor device and rocket motor.

24. The vehicle disabling device of claim 23 further comprising the rocket motor being solid fueled and the platform being wire guided.

25. The vehicle disabling device of claim 24 further comprising:
(a) the platform being mounted on the pursuit vehicle;
(b) the platform being wire guided by a cable means to the pursued vehicle;
(c) the cable means including a first cable and a second cable; and
(d) the rocket being fired by a means selected from the group consisting of fuse linked release and a mechanical release.

26. The vehicle disabling device of claim 25 further comprising:
(a) the first cable and the second cable being mounted on a double reel; and
(b) the double reel being a centrifugal brake to control the required substantially equal payout of the first cable and the second cable.

27. The vehicle disabling device of claim 25 further comprising:
(a) the first cable and the second cable being formed by splitting a joined, two-wire cable; and
(b) the joined, two-wire cable being split by a cutting means on the platform as dispersed.

28. The vehicle disabling device of claim 25 further comprising:
(a) the platform including wheels;
(b) a timer arming the rocket;
(c) a fire switch igniting the rocket;
(d) an inverter providing power to the cable; and
(e) the cable activating the disabling device.

29. The vehicle disabling device of claim 28 further comprising:
(a) the platform including wheels;
(b) the inverter being mounted on the pursuit vehicle; and
(c) a step up transformer being mounted on the platform, in order to divide a switch activation and to control activation of the disabling device.

30. The vehicle disabling device of claim 29 further comprising:
(a) a voltage regulator to control of voltage of the disabling device and prevent excess voltage from reaching capacitors; and
(b) an electronic switch being openable upon detection of adequate capacitor voltage by the voltage regulator.

31. A portable vehicle disabling device capable of contacting a pursued vehicle, sending a capacitive discharge therethrough, and disabling at least one electric system of a vehicle; the vehicle disabling device including a platform and a disabling circuit mounted thereon; the vehicle disabling device further including:
(a) the disabling circuit including a capacitor discharge device;
(b) a positioning means for placing the vehicle disabling device under the vehicle;
(c) a discharge means for activating the vehicle disabling device under the vehicle;
(d) the discharge means providing sufficient power with low to moderate energy levels to disable only the vehicle;
(e) the portable anti-vehicle electronic counter measure device being positionable where desired;
(f) a radio receiver connected to a battery contained on the platform;
(g) the battery causing an initial voltage input into a step up transformer and a voltage multiplier to form increased voltage; and
(h) the increased voltage being fed through a pair of isolation resistors.

32. The portable vehicle disabling device of claim 31, further comprising:
(a) the isolation resistors being connected to a safety breaker resistor and an energy storage capacitor;
(b) a first car electrode and a second car electrode being connected to the energy storage capacitor; and
(c) a radio receiver for activating the electrodes, and disabling at least one electronic system within the pursued vehicle in contact therewith.

33. A stationary vehicle disabling device capable of contacting a pursued vehicle passing thereover, sending a capacitive discharge therethrough, and disabling at least one electric system of a vehicle; the vehicle disabling device including a platform and a disabling circuit mounted thereon; the vehicle disabling device further including:
  (a) the disabling circuit including a capacitor discharge device;
  (b) a positioning means for placing the vehicle disabling device under the vehicle;
  (c) a discharge means for activating the vehicle disabling device under the vehicle;
  (d) the discharge means providing sufficient power with low to moderate energy levels to disable only the vehicle;
  (e) the portable anti-vehicle electronic counter measure device being positionable where desired;
  (f) a radio receiver connected to a battery contained on the platform;
  (g) the battery causing an initial voltage input into a step up transformer and a voltage multiplier to form increased voltage;
  (h) the increased voltage being fed through a pair of isolation resistors; and
  (i) a mounting means for securing the stationary anti-vehicle electronic counter measure device.

34. The stationary vehicle disabling device of claim 33, further comprising the mounting means being at least one selected from the group consisting of glue assembly and spike assembly.

35. The stationary vehicle disabling device of claim 33, further comprising the radio receiver being remotely activated from pursuit vehicle, or an officer in a vehicle or on foot.

36. The stationary vehicle disabling device of claim 33, further comprising the radio receiver being remotely operated.

37. A vehicle disabling device mounted on a pursuit vehicle and capable of contacting a pursued vehicle, sending a capacitive discharge therethrough, and disabling at least one electric system of a vehicle; the vehicle disabling device including a platform and a disabling circuit mounted thereon; the vehicle disabling device further including:
  (a) the disabling circuit including a capacitor discharge device;
  (b) a positioning means for placing the vehicle disabling device under the vehicle;
  (c) a discharge means for activating the vehicle disabling device under the vehicle;
  (d) the discharge means providing sufficient power with low to moderate energy levels to disable only the vehicle;
  (e) a launching means for releasing the vehicle disabling device from the pursuit vehicle to the pursued vehicle;
  (f) the launching means being a mortar attached to the pursuit vehicle;
  (g) a battery power pack for the mortar chargeable by the pursuit vehicle battery; and
  (h) an impact switch for activating the vehicle disabling device on launch.

38. The vehicle disabling device of claim 37 further comprising:
  (a) a launch tube for the mortar being mounted on a sabot in an angled mounting bracket;
  (b) the angled mounting bracket being mounted on the pursuit vehicle; and
  (c) a propellant charge for launching the disabling device from the mortar in the sabot.

39. A vehicle disabling device mounted on a pursuit vehicle and capable of contacting a pursued vehicle, sending a capacitive discharge therethrough, and disabling at least one electric system of a vehicle; the vehicle disabling device including a platform and a disabling circuit mounted thereon; the vehicle disabling device further including:
  (a) the disabling circuit including a capacitor discharge device;
  (b) a positioning means for placing the vehicle disabling device under the vehicle;
  (c) a discharge means for activating the vehicle disabling device under the vehicle;
  (d) the discharge means providing sufficient power with low to moderate energy levels to disable only the vehicle;
  (e) a launching means for releasing the vehicle disabling device from the pursuit vehicle to the pursued vehicle; and
  (f) the launching means being a traction motor device attached to the pursuit vehicle;
  (g) a battery power pack for the vehicle disabling device chargeable by the pursuit vehicle battery; and
  (h) an impact switch for activating the vehicle disabling device on launch.

40. The vehicle disabling device of claim 39, further comprising:
  (a) the traction motor device having four traction drive wheels on each corner of the traction motor device;
  (b) the four traction drive wheels being operated by a separate motor; and
  (c) a constant torque controller being operably connected to each motor to provide torque control and to keep the motors at a constant speed.

41. The vehicle disabling device of claim 40, further comprising:
  (a) a cable reel having a joined cable;
  (b) a cutting means for separating the joined cable upon launch of the vehicle disabling device; and
  (c) a guide means for the split cable.

42. The vehicle disabling device of claim 41, further comprising:
  (a) the cutting means being a knife; and
  (b) the guide means being at least one tetrafluoroethylene-coated, low friction sleeve.

43. A vehicle disabling device mounted on a pursuit vehicle and capable of contacting a pursued vehicle, sending a capacitive discharge therethrough, and disabling at least one electric system of a vehicle; the vehicle disabling device including a platform and a disabling circuit mounted thereon; the vehicle disabling device further including:
  (a) the disabling circuit including a capacitor discharge device;
  (b) a positioning means for placing the vehicle disabling device under the vehicle;
  (c) a discharge means for activating the vehicle disabling device under the vehicle;
  (d) the discharge means providing sufficient power with low to moderate energy levels to disable only the vehicle;

(e) a launching means for releasing the vehicle disabling device from the pursuit vehicle to the pursued vehicle; and (f) a guiding means being a crimped wire device attached to the pursuit vehicle;

(g) a battery power pack for a mortar chargeable by the pursuit vehicle battery; and (h) an impact switch for activating the vehicle disabling device on launch.

44. The vehicle disabling device of claim 43 further comprising:

(a) the crimped wire device including a length of two strand wire mounted on a reel;

(b) a pair of crimping wheels receive the two strand wire therebetween to form crimped wire; and (c) a cutting means for the crimp wire to form two cables from the two strand wire.

45. A vehicle disabling device capable of contacting a pursued vehicle, sending a capacitive discharge therethrough, and disabling at least one electric system of a vehicle; the vehicle disabling device including a platform and a disabling circuit mounted thereon; the vehicle disabling device further including:

(a) the disabling circuit including a capacitor discharge device;

(b) a positioning means for placing the vehicle disabling device under the vehicle;

(c) a discharge means for activating the vehicle disabling device under the vehicle;

(d) the discharge means providing sufficient power with low to moderate energy levels to disable only the vehicle; and (e) the positioning means including a wire assembly coiled in a fire hose fashion.

46. A method for disabling a first vehicle, comprising:

(a) administering a capacitive or an inductive discharge to an undercarriage of the first vehicle;

(b) overloading at least one electronic engine control of the vehicle; and (c) causing failure of the at least one electronic engine control of the first vehicle to disable the vehicle.

47. The method of claim 46 further, comprising:

(a) administering a capacitive or an inductive charge of about 30 to about 400 kilo volts to the first vehicle;

(b) the charge being administered through a bonding wire, a contact block, and a feeder cable inductance; an arc resistance and a capacitor equivalent series resistance; and a capacitance for an energy storage capacitor; and (c) a current flow from the discharge means to the vehicle being based on the formulas;

$$Z=(L/C)^{0.5}+R$$

$$I=V/Z$$

with L being is the sum of the inductance for the bonding wire, the contact block, and the feeder cable inductance; R being the sum total of the arc resistance and the capacitor equivalent series resistance; C being the capacitance of the energy storage capacitor, I being the current in amps, and V being the voltage.

48. The method of claim 47 further, comprising:

(a) administering a capacitive or an inductive charge to the first vehicle up to about 5 microfarads of capacitance limited by about a 1 to about 2 ohm resistance, which result in less than 1000 Joules of energy with current limited to about 15,000 amperes; and (b) the charge further providing an electromagnetic field strength of about 150 to 800 volts per meter.

49. The method of claim 48 further comprising administering the capacitive or the inductive charge from a portable source.

50. The method of claim 48 further comprising administering the capacitive or the inductive charge from a fixed source.

51. The method of claim 48 further comprising administering the capacitive or the inductive charge from a launched source.

52. The method of claim 51 further comprising the launched source being a second vehicle with a rocket powered assist.

53. A vehicle disabling device capable of contacting a pursued vehicle, sending a capacitive discharge therethrough, and disabling at least one electric system of a vehicle; the vehicle disabling device including a platform and a disabling circuit mounted thereon; the vehicle disabling device further including:

(a) the disabling circuit including a electromagnetic pulse generating device;

(b) a positioning means for placing the vehicle disabling device under the pursued vehicle;

(c) a discharge means for activating the vehicle disabling device under the pursued vehicle;

(d) the discharge means providing sufficient power with low to moderate energy levels to disable only the vehicle;

(e) the discharge means providing about 30 to about 400 kilo volts to the pursued vehicle;

(f) the discharge means including a bonding wire, a contact block, and a feeder cable inductance; an arc resistance; and (g) the discharge means further providing an electromagnetic field strength of about 150 to 800 volts per meter.

* * * * *

Adverse Decisions In Interference

Patent No. 5,503,059, David R. Pacholok, VEHICLE DISABLING DEVICE AND METHOD, Interference No. 103,830, final judgment adverse to the patentee rendered January 26, 2001, as to claims 1-53.
*(Official Gazette August 7, 2001)*